Oct. 11, 1966     F. R. CHEEK     3,277,910

GOVERNORS FOR AUTOMATIC TRANSMISSIONS

Original Filed Dec. 27, 1954

INVENTOR.
Forrest R. Cheek
BY
W. C. Middleton
ATTORNEY

United States Patent Office

3,277,910
Patented Oct. 11, 1966

3,277,910
GOVERNORS FOR AUTOMATIC TRANSMISSIONS
Forrest R. Cheek, Detroit, Mich., assignor to General Motors Corporation, Detroit, Mich., a corporation of Delaware
Original application Dec. 27, 1954, Ser. No. 477,832, now Patent No. 3,048,055, dated Aug. 7, 1962. Divided and this application July 31, 1962, Ser. No. 213,799
6 Claims. (Cl. 137—54)

This invention relates to governors for automatic transmissions and more particularly to governors of the type driven by the output shaft of the transmission and constructed to develop two fluid pressures which increase with output shaft speed of rotation.

The present invention is a division of application Serial No. 477,832, filed December 27, 1954 (now Patent No. 3,048,055 issued August 7, 1962) and assigned to the assignee of the present application. The disclosure of such copending application is incorporated herein by reference.

In automatic transmissions having gearing which can be conditioned for different ratios of drive it is desirable that the change from one ratio to another be accomplished in part in accordance with change in speed of the output shaft of the transmission. To this end, provision is made for a governor or regulator valve assembly which revolves about an axis under drive from the output shaft of the transmission which assembly is so constructed as to regulate pressure delivered from a source of pressure to provide delivered pressures varying with the speed of the output shaft.

An object of the invention is to provide a novel type of governor operable to supply liquid under pressure through two different paths from the governor with a single supply of liquid to the governor.

Another object of the invention is to provide a governor in which one metering valve thereof is held normally in position to cause the delivery of liquid under metered pressure even though the governor is at rest.

Figure 1:
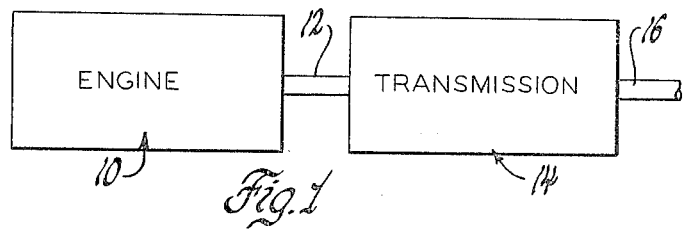
Figure 2:
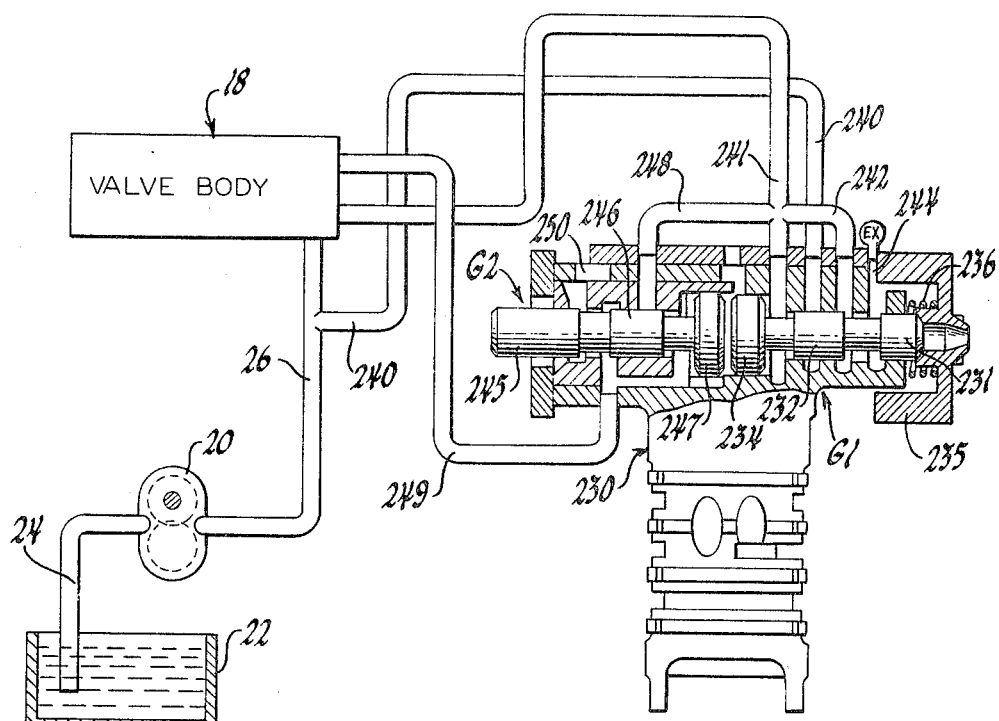

Other features, objects and advantages of the invention will become apparent from the following description and the accompanying drawings in which:

FIGURE 1 represents diagrammatically an engine driving an automatic transmission, the output of which can be connected to drive the wheels of a vehicle; and FIGURE 2 is a diagrammatic illustration of the governor associated with a valve body utilized in controlling the operation of the automatic transmission.

FIGURE 1 illustrates an arrangement wherein an engine 10 has its output shaft 12 connected to supply the input of the automatic transmission 14 which may be of the type described in the copending application before identified. The output shaft 16 of this transmission can be connected to the drive wheels of a vehicle.

Within the transmission, in addition to planetary gearing or the like, is a valve body 18 which contains the various valves utilized for conditioning the gearing for various ratios of drive. Associated with the valve body 18 is a pump 20 which draws liquid from a sump 22 through intake line 24 and delivers the same to the valve body through discharge line 26.

The governor utilized in this transmission is similar in major details to that illustrated and described in Thompson Patent No. 2,204,872, issued June 18, 1940, for Change Speed Gearing and Control. This governor has been illustrated with its oil channels shown in diagrammatic fashion for purposes of clarity. The body of the governor, indicated at 230, is rotated by the output shaft 16. Mounted within the body are two metering valves which function to permit the development of pressure rising in response to increased speed of rotation of the governor. The first metering valve, or G–1, is slidably mounted in a bore in the governor body and has lands 231 and 232 of equal diameters, and a larger land 234. A weight 235 is attached to the outer end of the valve, and this weight is biased outwardly by a spring 236.

Oil supplied to the governor by branch line 240 from main line 26 enters the bore of the body and if the governor is at rest the spring 236 will move the member G–1 to the right sufficiently to cause land 232 to uncover the port connected to the line 240, whereupon the oil will pass through the bore and out the line 241. From this line distribution is made to various parts of the system and a pressure is soon developed which acts on the larger area of the land 234 to move the valve G–1 to the left, closing the port connected to line 240 and opening a branch line 242 to exhaust at port 244, with the oil passing between the lands 231 and 232. The pressure developed with the governor at rest therefore is equal to that necessary to balance the strength of spring 236. When the governor is rotating, centrifugal force acting on the weight 235 moves the valve member G–1 outwardly so that a greater developed pressure in the supply line 241 is necessary to counteract centrifugal force on the weight. It will be seen that this action is similar to that described in the Thompson patent before identified, with the exception that a predetermined developed pressure is delivered by the governor, even when the output shaft is stationary. This present governor also differs from that of the Thompson patent by the omission of a second supply line to the valve member identified as G–2, which member has lands 245 and 246 of equal diameters and land 247 of larger diameter. A branch line 248 from the G–1 supply line 241 conducts oil under the pressure determined by the G–1 valve to the bore in which G–2 valve is slidable. When centrifugal force, acting on the weight of this valve, moves it outwardly, the port connected to line 248 is opened by land 246, permitting oil to pass between lands 246 and 247 and thence outwardly into the G–2 delivery passage 249, to be distributed to various parts of the system. When the pressure developed in the line 249 and acting on the large area of land 247 is sufficient to overcome the effect of centrifugal force on this valve including lands 245, 246 and 247, the G–2 valve is moved to the right, closing the port connected to line 248 and then opening the line 249 to exhaust at 250. The metering action of the G–2 part of the governor takes place only when the governor is rotating, and the pressure delivered thereby increases at a slower rate than the pressure delivered by the G–1 part thereof. The fluid under pressure delivered by the two metering valves is utilized in the transmission controls in usual fashion and particularly as set forth in the copending application before identified.

What is claimed is:

1. A governor for a hydraulically controlled transmission, said governor comprising a body rotated by said transmission, first and second metering valves mounted in said body for revolution about the axis of rotation of said body, said metering valves having inlets and outlets for liquid, the first of said metering valves having a greater mass subject to centrifugal force than the second of said metering valves, a source of liquid under pressure, a connection between said source and the inlet of the first of said metering valves, the output of said first valve varying in pressure with the speed of rotation of said body, and a connection between the output of said first valve and the inlet of said second valve, the pressure of the output of said second valve varying in accordance with the speed of rotation of said body but at a different rate from the variations in the output of said first valve.

2. A governor for a hydraulically controlled transmission, said governor comprising a body rotated by said transmission, first and second metering valves mounted in said body for revolution about the axis of rotation of said body, said metering valves having inlets and outlets for liquid, the first of said metering valves having a greater mass subject to centrifugal force than the second of said metering valves, a source of liquid under pressure, a connection between said source and the inlet of the first of said metering valves, the output of said first valve being subject to the effect of centrifugal force and the delivered pressure for varying the output pressure with the speed of rotation of said body, and a connection between the output of said first valve and the inlet of said second valve, the pressure of the output of said second valve varying in accordance with the speed of rotation of said body but at a different rate from the variations in the output of said first valve.

3. A governor for a hydraulically controlled transmission, said governor comprising a body rotated by said transmission, first and second metering valves mounted in said body for revolution about the axis of rotation of said body, said metering valves having inlets and outlets for liquid, the first of said metering valves having a greater mass subject to centrifugal force than the second of said metering valves, a source of liquid under pressure, a connection between said source and the inlet of the first of said metering valves, the output of said first valve varying in pressure with the speed of rotation of said body, a connection between the output of said first valve and the inlet of said second valve, the pressure of the output of said second valve varying in accordance with the speed of rotation of said body but at a different rate from the variations in the output of said first valve, and means normally biasing said first valve to a position for delivery of liquid thereby when said body is at rest.

4. A governor for a hydraulically controlled transmission, said governor comprising a body rotated by said transmission, first and second metering valves mounted in said body for revolution about the axis of rotation of said body, said metering valves having inlets and outlets for liquid, the first of said metering valves having a greater mass subject to centrifugal force than the second of said metering valves, a source of liquid under pressure, a connection between said source and the inlet of the first of said metering valves, the output of said first valve varying in pressure with the speed of rotation of said body, a connection between the output of said first valve and the inlet of said second valve, the pressure of the output of said second valve varying in accordance with the speed of rotation of said body but at a different rate from the variations in the output of said first valve, and means normally biasing said first valve to a position for delivery of liquid thereby when said body is at rest, said last mentioned delivery of liquid being restrained to a predetermined maximum pressure.

5. A governor for a hydraulically controlled transmission, said governor comprising a body rotated by said transmission, first and second metering valves mounted in said body for revolution about the axis of rotation of said body, said metering valves having inlets and outlets for liquid, the first of said metering valves having a greater mass subject to centrifugal force than the second of said metering valves, a source of liquid under pressure, a connection between said source and the inlet of the first of said metering valves, the output of said first valve being subject to the effect of centrifugal force and the delivered pressure for varying the output pressure with the speed of rotation of said body, a connection between the output of said first valve and the inlet of said second valve, the pressure of the output of said second valve varying in accordance with the speed of rotation of said body but at a different rate from the variations in the output of said first valve, and means normally biasing said first valve to a position for delivery of liquid thereby when said body is at rest.

6. A governor for a hydraulically controlled transmission, said governor comprising a body rotated by said transmission, first and second metering valves mounted in said body for revolution about the axis of rotation of said body, said metering valves having inlets and outlets for liquid, the first of said metering valves having a greater mass subject to centrifugal force than the second of said metering valves, a source of liquid under pressure, a connection between said source and the inlet of the first of said metering valves, the output of said first valve being subject to the effect of centrifugal force and the delivered pressure for varying the output pressure with the speed of rotation of said body, a connection between the output of said first valve and the inlet of said second valve, the pressure of the output of said second valve varying in accordance with the speed of rotation of said body but at a different rate from the variations in the output of said first valve, and means normally biasing said first valve to a position for delivery of liquid thereby when said body is at rest, said last mentioned delivery of liquid being restrained to a predetermined maximum pressure.

References Cited by the Examiner

UNITED STATES PATENTS

| | | | |
|---|---|---|---|
| 2,204,872 | 6/1940 | Thompson | 74—472 |
| 2,711,749 | 6/1955 | Hettinger | 137—56 |
| 2,738,650 | 3/1956 | McAfee | 137—56 X |
| 2,889,844 | 6/1959 | McFarland | 137—56 X |
| 2,911,987 | 11/1959 | Wayman | 137—56 X |
| 3,086,541 | 4/1963 | De Corte | 137—56 |

FOREIGN PATENTS 790,618    2/1958    Great Britain.

WILLIAM F. O'DEA, *Primary Examiner.*

CLARENCE R. GORDON, ISADOR WEIL, *Examiners.*